United States Patent
Doyle et al.

(10) Patent No.: US 10,001,979 B2
(45) Date of Patent: Jun. 19, 2018

(54) AVOIDING GUARD TEST INVALIDATION FOR VIRTUAL AND INTERFACE CALLS

(71) Applicant: International Business Machines Corporation, Armonk, NY (US)

(72) Inventors: Patrick R. Doyle, Toronto (CA); Daniel J. Heidinga, Ottawa (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 14/951,532

(22) Filed: Nov. 25, 2015

(65) Prior Publication Data
US 2017/0147304 A1    May 25, 2017

(51) Int. Cl.
*G06F 9/455* (2018.01)
*G06F 9/45* (2006.01)

(52) U.S. Cl.
CPC ............ *G06F 8/443* (2013.01); *G06F 8/4443* (2013.01); *G06F 8/41* (2013.01); *G06F 9/4552* (2013.01); *G06F 9/45504* (2013.01); *G06F 9/45508* (2013.01); *G06F 9/45516* (2013.01)

(58) Field of Classification Search
CPC .................. G06F 8/443; G06F 8/4443; G06F 9/45504–9/4552
USPC .................................................. 717/140–161
See application file for complete search history.

(56) References Cited

U.S. PATENT DOCUMENTS

| | | | | |
|---|---|---|---|---|
| 6,714,942 B1* | 3/2004 | Westcott | ................. | G06F 9/443 707/956 |
| 7,024,657 B2* | 4/2006 | Kawai | ................... | G06F 9/4433 717/116 |
| 8,458,681 B1* | 6/2013 | Coutant | ................ | G06F 8/4435 717/124 |

(Continued)

OTHER PUBLICATIONS

Ishizaki, K., et al., A Study of Devirtualization Techniques for a Java™ Just-In-Time Compiler, Proceedings of the 15th ACM SIGPLAN conference on Object-oriented programming, systems, languages, and applications, 2000, pp. 294-310, [retrieved on Feb. 7, 2018], Retrieved from the Internet: <URL:http://dl.acm.org/>.*

(Continued)

*Primary Examiner* — Geoffrey St Leger
(74) *Attorney, Agent, or Firm* — Brian M. Restauro

(57) ABSTRACT

Embodiments of the present invention provide methods, computer program products, and systems for optimizing virtual calls. Embodiments of the present invention can be used to receive a virtual call associated with a first implementation method and identify a virtual call associated with a second implementation method that appears to have similar functionality to the first implementation method. Embodiments of the present invention can determine whether the virtual call associated with the first implementation method and the virtual call associated with the second implementation method produce the same result and, responsive to determining that the virtual call associated with the first implementation method and the virtual call associated with the second implementation method produce the same result, use a result of the virtual call associated with the first implementation method as a result of the virtual call associated with the second implementation method.

8 Claims, 5 Drawing Sheets

(56) References Cited

U.S. PATENT DOCUMENTS

| | | | |
|---|---|---|---|
| 8,819,649 B2 | 8/2014 | Lafreniere et al. | |
| 9,164,735 B2* | 10/2015 | Hux | G06F 8/24 |
| 2004/0010664 A1* | 1/2004 | Cierniak | G06F 9/52 |
| | | | 711/152 |
| 2004/0210885 A1* | 10/2004 | Wang | G06F 8/71 |
| | | | 717/158 |
| 2005/0138611 A1* | 6/2005 | Inglis | G06F 9/4431 |
| | | | 717/151 |
| 2006/0130014 A1* | 6/2006 | Tanaka | G06F 9/443 |
| | | | 717/136 |
| 2006/0150164 A1* | 7/2006 | Agrawal | G06F 9/4433 |
| | | | 717/136 |
| 2008/0172658 A1* | 7/2008 | Russell | G06F 9/45516 |
| | | | 717/138 |
| 2008/0172662 A1* | 7/2008 | Harris | G06F 8/443 |
| | | | 717/159 |
| 2013/0305230 A1 | 11/2013 | Inoue | |
| 2014/0089905 A1* | 3/2014 | Hux | G06F 8/24 |
| | | | 717/140 |
| 2014/0245274 A1* | 8/2014 | Inoue | G06F 8/4443 |
| | | | 717/151 |

OTHER PUBLICATIONS

Suganuma, T., et al., An Empirical Study of Method Inlining for a Java Just-In-Time Compiler, Usenix Java VM'02, 2002, 11 pages, [retrieved on Feb. 7, 2018], Retrieved from the Internet: <URL:https://www.usenix.org/legacy/events/javavm02/suganuma/suganuma_html/index.html>.*

Sõnajalg, S., Program Analysis Techniques for Method Call Devirtualization in Object-Oriented Languages, Dec. 7, 2009, pp. 1-14, [retrieved on Jun. 20, 2017], Retrieved from the Internet: <URL:http://kodu.ut.ee/~varmo/seminar/sem09S/final/s6najalg.pdf>.*

"NOPing of null tests involving a static of an uninitialized declared type", An IP.com Prior Art Database Technical Disclosure, Authors et. al.: Disclosed Anonymously, IP.com No. 000239912, IP.com Electronic Publication: Dec. 12, 2014, pp. 1-3, <http://null/IPCOM/000239912>.

* cited by examiner

```
                    408                                                      400
                    ⌢
                public void foo(...) {
                ...           404
                MyList o = bar(x); //           410                412
                406                             ⌢                 ⌢
                int j = o.getSize(); // call MyArrayList.getSize or MyLinkedList.getSize
                ...           402
                } public MyList bar(int i) {
                   if (i < 100)
                      return new MyArrayList();
                   else if (i < 200)                    414
                      return new MyLinkedList();
                   else {
                      ...
                   }
                }     416
                ⌢
                MyList defined as :
                abstract class MyList {              // abstract int getSize();

abstract void setSize(int sz);

}          418
                           ⌢
                Class MyArrayList extends MyList { int arrayListSize;
                       419
                   Object[] data;

int getSize() { return this.arrayListSize; } void setSize(int sz) { this.arrayListSize = sz; }
                }          420
                           ⌢
                class MyLinkedList extends MyList { int linkedListSize;
                       421
                   Object head;

int getSize() { return this.linkedListSize; } void setSize(int sz) { this.linkedListSize = sz; }

AVOIDING GUARD TEST INVALIDATION FOR VIRTUAL AND INTERFACE CALLS

BACKGROUND

The present invention relates generally to the field of just-in time (JIT) compilers, and more particularly JIT compilers for optimizing virtual and interface calls.

In an object-oriented programming language, program instructions are arranged into routines called "methods" that are associated with the data upon which those routines operate. When a program requires some functionality to be executed, it performs a method call. Generally speaking, the method call automatically selects the appropriate method implementation for the particular classes of data objects upon which that method is to operate. This process is often referred to as a "virtual method dispatch". For example, payroll software might have a method "calculateBonus" with one implementation for contract workers, and another for regular full-time staff. This payroll program can run through a list of employees and calculate bonuses on each one, knowing the correct implementation of "calculateBonus" will be used for each employee.

Dynamic compilation can be used to run programs, using a compiler (e.g., a just-in-time compiler (JIT compiler)), while the program is running. The compiler translates a program from one representation (such as the original source code) into the native machine language of the computer processor on which the program will execute. Compilation provides better performance when contrasted against other means of running programs (e.g., interpreting the program, one statement at a time, in its original form).

To improve performance further, compilers typically employ an optimizer that identifies inefficient portions of the program and replaces those inefficient portions with high-performance alternatives without affecting the correctness of the program. One of the most important optimizations is inline method expansion, also referred to as "inlining", which identifies a method call, and replaces it with an inline copy of the called method's code.

In some cases, however, a virtual method dispatch can specify that different versions of the method call could be called for different objects based on different conditions. In those instances, when a virtual method dispatch is executed, a declared method that can override the virtual method call can be invoked, make it impossible to achieve inlining. Techniques solving this problem are generally known as "devirtualization" by eliminating that potentially expensive method lookup and involves immediately knowing which method is supposed to be run. Guarded devirtualization refers to a procedure where a class or method test is used to ensure that the inlined procedure or the direct call to a target method is valid. Typically, the optimizer determines which of the possible method implementations will be executed based on certain conditions and inlines that specific method responsive to determining that the condition which led to the selection of the specific method is always true. In instances where the condition fails (i.e., is no longer true), the optimizer can perform a revirtualization.

SUMMARY

Embodiments of the present invention provide methods, computer program products, and systems for optimizing virtual calls. In one embodiment, a method is provided comprising: receiving a virtual call associated with a first implementation method; identifying a virtual call associated with a second implementation method that appears to have similar functionality to the first implementation method; determining whether the virtual call associated with the first implementation method and the virtual call associated with the second implementation method produce the same result; and responsive to determining that the virtual call associated with the first implementation method and the virtual call associated with the second implementation method produce the same result, using a result of the virtual call associated with the first implementation method as a result of the virtual call associated with the second implementation method.

BRIEF DESCRIPTION OF THE DRAWINGS

FIG. 4 is an example bytecode that is verified as having equivalence, in accordance with an embodiment of the present invention.

DETAILED DESCRIPTION

Embodiments of the present invention recognize the need to reduce cases where a devirtualization guard is invalidated. Typically, a devirtualization guard is invalidated when a second class with a different implementation of the virtual or interface method is loaded. In instances where a devirtualization guard is invalidated, a JIT compiler considers the different implementation of the virtual or interface method even if the different implementation has equivalence to the first class, which can cause a slow dispatch. Embodiments of the present invention provide solutions for reducing cases where a devirtualization guard is invalidated. In this manner, as discussed in greater detail later in this specification, embodiments of the present invention can be used to reduce instances where a devirtualization guard is invalidated which obviates the need to perform a slow dispatch by using method equivalence.

Figure 1:
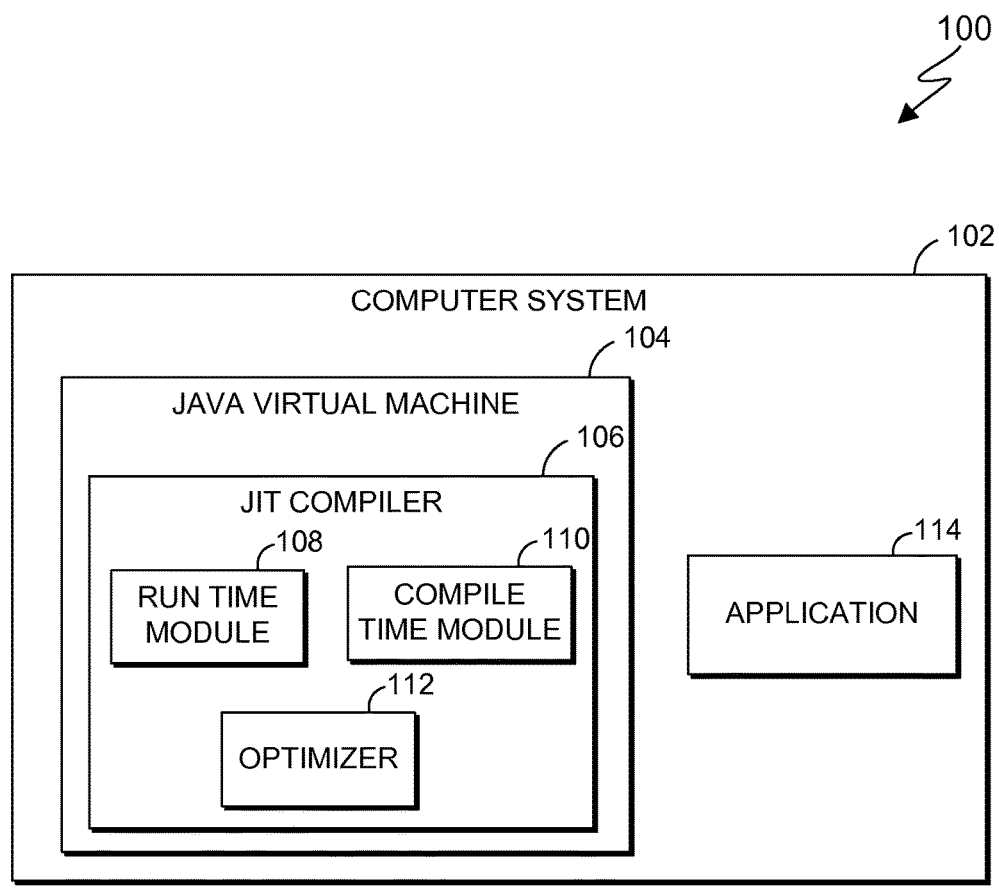
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 102. Computer system 102 can be a desktop computer, laptop computer, specialized computer server, or any other computer system known in the art. In certain embodiments, computer system 102 represent computer systems utilizing clustered computers and components to act as a single pool of seamless resources when accessed through a network (not shown). For example, such embodiments may be used in data center, cloud computing, storage area network (SAN), and network attached storage (NAS) applications. In certain embodiments, computer system 102 represents a virtual machine. In general, computer system 102 is representative of any electronic devices, or combination of electronic devices, capable of executing machine-readable program instructions, as described in greater detail with regard to FIG. 5.

Computer system 102 includes Java virtual machine 104 and application 114. Java virtual machine 104 is a platform independent execution environment that can be used to convert and execute Java bytecode into machine language. (Note: the term "JAVA" may be subject to trademark rights in various jurisdictions throughout the world and are used here only in reference to the products or services properly denominated by the marks to the extent that such trademark rights may exist.) Java virtual machine 104 includes JIT compiler 106. JIT compiler 106 includes runtime module 108, compile time module 110, and optimizer 112. JIT compiler 106 can interpret, execute bytecode, or compile individual methods into machine executable code using runtime module 108 to load executable bytecode and compile time module 110 to compile individual methods into machine executable code.

Optimizer 112 analyzes a program (e.g., application 114), removes inefficient code, and replaces the inefficient code with efficient code (e.g., performs inlining functions, removes repeated computation, pulls computations out of loop, etc.). The term "inlining", as used herein, refers to a process whereby a method call is identified and replaced with an inline copy of the called method's code. For example, a program to calculate "x+y" can be written, where x=1 and y=secondNumber. Optimizer 112 can identify that the object (e.g., secondNumber) points to 2". Instead of issuing a virtual method call every time the program is run to calculate "x+y", optimizer 112 can inline the code so that the program reads "1+2" instead of "1+y", performing a virtual call to determine that y=2 before adding the values. For example, before inlining, the following program to calculate "x+y" could be written:

Program 1

```
class Calculator {
  void calculate( ) {
    int x = 1;
    int y = secondNumber( );
    print x+y;
  }
  int secondNumber( ) {
    return 2;
  }
}
```

In Program 1, x is 1; y is secondNumber, wherein "secondNumber" is the method being inlined; "return 2" is the method being called by "secondNumber"; and "print x+y" is the target operation to be performed.

Optimizer 112 can inline (i.e., perform a method expansion on) the object (e.g., 2) that the method "secondNumber" returns. Thus, the program would now behave as follows:

Program 2

```
void calculate( ) {
    int x = 1;
    int y = 2;
    print 1+2;
}
```

Optimizer 112 can further optimize the program so that variables x and y are no longer needed and the algebraic simplification can determine that "1+2=3". Optimizer 112 can then use a standard optimization known as "copy propagation" to rewrite the program to the equivalent of a more optimized version as follows:

Program 3

```
void calculate( ) {
  print 3;
}
```

In instances where there are different versions of the method secondNumber (i.e., more than one class to call different objects), optimizer 112 can perform a devirtualization by identifying which of the possible method implementations need to be executed. For example, each method can be included in one or more classes (e.g., a base class and one or more sub classes) that could have one or more different implementations of a virtual function associated with the one or more classes. A "class", as used herein, refers to an extensible program-code template for creating objects, providing initial values for state (member variables) and implementations of behavior (member functions, methods). In this embodiment, a class can be a base class (i.e., designates a parent/original class) or a sub class (i.e., designates a child/derivative of the base class). An example of a performed devirtualization is as follows:

Program 4

```
void calculate( ) {
    int x = 1;
    int y;
    if (object's class is Calculator)
        y = Calculator::secondNumber( );
    else
        y = secondNumber( );
    print x+y;
}
```

In Program 4, x is 1; y is determined based on a conditional statement; "if" denotes the conditional statement that determines what is called; "Calculator::secondNumber" is the non-virtual call that satisfies the conditional statement that instructs the program that if the object's class is a calculator then call the calculator-specific version of the secondNumber method.

Optimizer 112 can then inline the non-virtual call as follows:

Program 5

```
void calculate( ) {
    int x = 1;
    int y;
    if (object's class is Calculator)
        y = 2;
    else
        y = secondNumber( );
    print x+y;
}
```

In instances where optimizer 112 can then determine that no other objects in the system can override the call (e.g., secondNumber), the program can be modified to eliminate the "if" statement:

```
Program 6 void calculate( ) {
    int x = 1;
    int y;
    if (TRUE)
        y = 2;
    else
        y = secondNumber( );
    print x+y;
}
```

In instances where a new object is created and specifies an alternative implementation of the method (e.g., secondNumber), optimizer 112 records the location of this conditional "if" statement so that when the program runs, optimizer 112 can patch the code (i.e., revirtualization) if secondNumber is ever overridden (as denoted by the following program):

```
Program 7 void calculate( ) {
    int x = 1;
    int y;
    if (FALSE)
        y = 2;
    else
        y = secondNumber( );
    print x+y;
}
```

Optimizer 112 helps improve performance by avoiding revirtualization (i.e., slow dispatch) by verifying method equivalence. The term, "method equivalence", as used herein, refers to a technique for determining whether two different implementations result in the same output. For example, two implementations of a method can have the same bytecode but different constant pool references (i.e., an ordered set of constants used by the type, including literals (string, integer, and floating point constants) and symbolic references to types, fields, and methods). Despite having different constant pool references, the two implementation methods could still have method equivalence if the resulting output is the same (e.g., maps to the same v-table or instance field offsets), which means the implementation methods are method equivalent. In this embodiment, optimizer 112 verifies method equivalence and helps avoid slow dispatch by verifying that a second method has the same bytecodes and modifiers as an identified first method. Optimizer 112 further verifies method equivalence by verifying that the constant pool reference produces the same result, as discussed in greater detail with regard to FIG. 3.

Application 114 is a program that loads classes with one or more implementation methods for a virtual call or method call to java virtual machine 104. In general, application 114 can be implemented with any program that can load classes with one or more implementation methods for a virtual or method call to java virtual machine 104.

Figure 2:
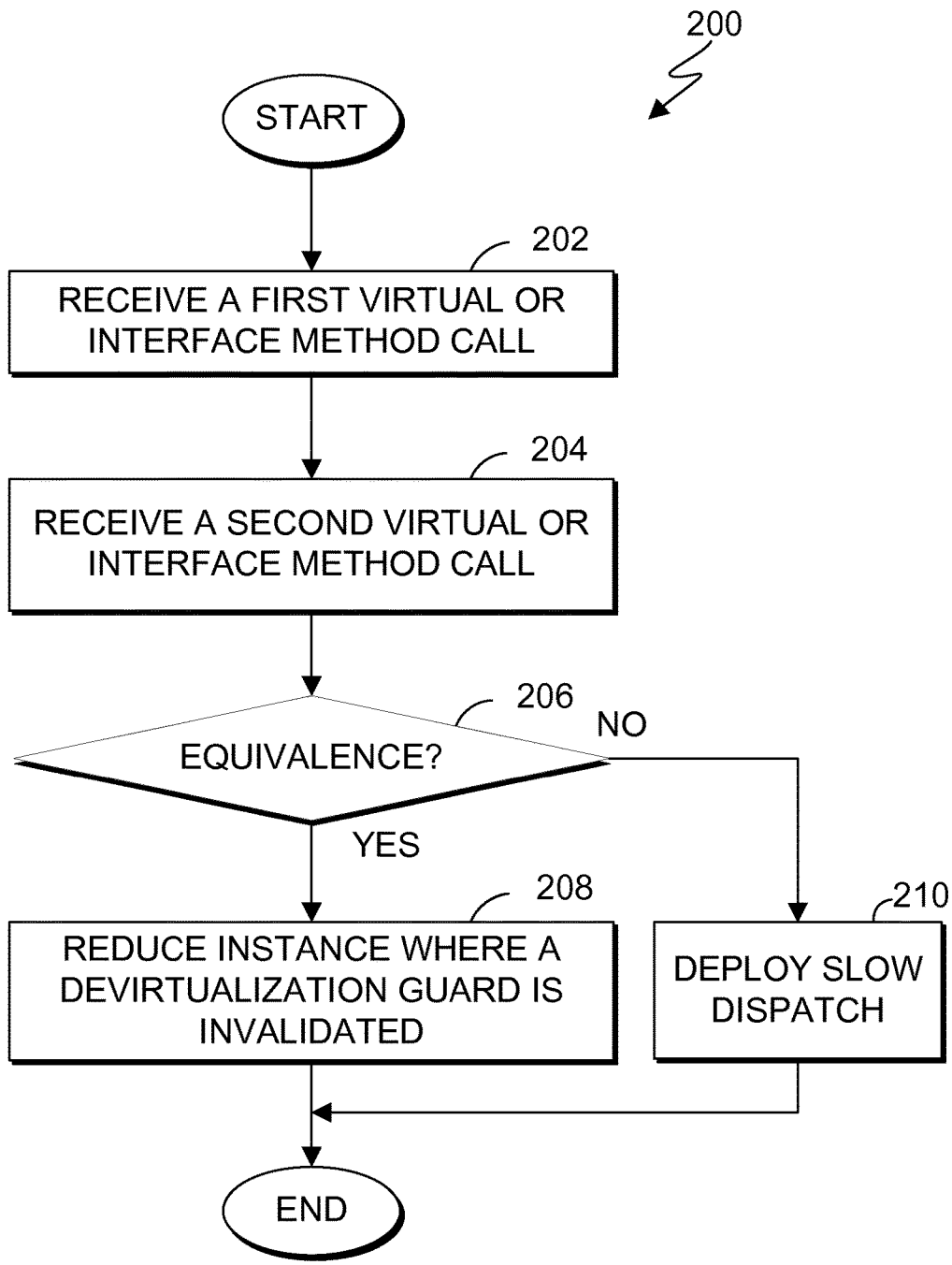
FIG. 2 is a flowchart illustrating operational steps for reducing guard test invalidation, in accordance with an embodiment of the present invention.

FIG. 2 is a flowchart 200 illustrating operational steps for reducing guard test invalidation, in accordance with an embodiment of the present invention. For illustrative purposes, the following discussion is made with respect to a JIT compiler (e.g., JIT compiler 106) performing at compile time, it being understood that the operational steps of flowchart 200 can be performed during run time.

In step 202, JIT compiler 106 receives a first call. In this embodiment, the first call can be a virtual or interface method call. For example, JIT compiler 106 can receive a method call "foo" for compilation. In this embodiment, JIT compiler 106 receives the first call from application 114. In other embodiments, JIT compiler 106 receives the first call from one or more other components of computing environment 100.

In step 204, JIT compiler 106 receives a second virtual or interface method call. In this embodiment, JIT compiler 106 receives the second call from application 114 in the same manner as previously discussed in step 202.

In step 206, JIT compiler 106 determines equivalence between the first and the second call. In this embodiment, JIT compiler 106 determines equivalence by identifying the implementation methods of the first and second virtual call and comparing the first and the second virtual call implementation methods, as discussed in greater detail with regard to FIG. 3.

If, in step 206, JIT compiler 106 determines that there is equivalence between the first and the second call, then, in step 208, JIT compiler 106 reduces instance where devirtualization guard is invalidated thereby avoiding a slow dispatch. In this embodiment, JIT compiler 106 reduces instances where a devirtualization guard is invalided by using a previously identified inlined method that has equivalence to the implementation method of the second call. By using the previously identified inlined method, JIT compiler 106 can reduce instances where a devirtualization guard is invalidated which obviates the need to perform a slow dispatch by using method equivalence.

If, in step 206, JIT compiler 106 determines that there is no equivalence between the first and the second call, then, in step 210, JIT compiler 106 deploys a slow dispatch (i.e., issues a patch and performs a revirtualization). For example, JIT compiler 106 can issue a patch that effectively avoids the inlined path (i.e., the fast path) by patching in an unconditional jump to the slow dispatch. For future instances where this code is executed, the unconditional jump is executed, taking the flow of execution to the code for the slow dispatch.

Accordingly the slow dispatch code is executed. In this embodiment a slow dispatch is performed by reading the class from the object, reading the virtual function from the table from the class and reading the virtual function table entry for the specific virtual method being called. For example, the method implementation to be invoked is looked up (e.g., a virtual call would have to load the virtual function table) from the class of the object used as the receiver of the call (e.g., usually 2 indirect loads based off of the object) and dispatch to the method in the virtual function table at the appropriate index for the virtual call.

Figure 3:
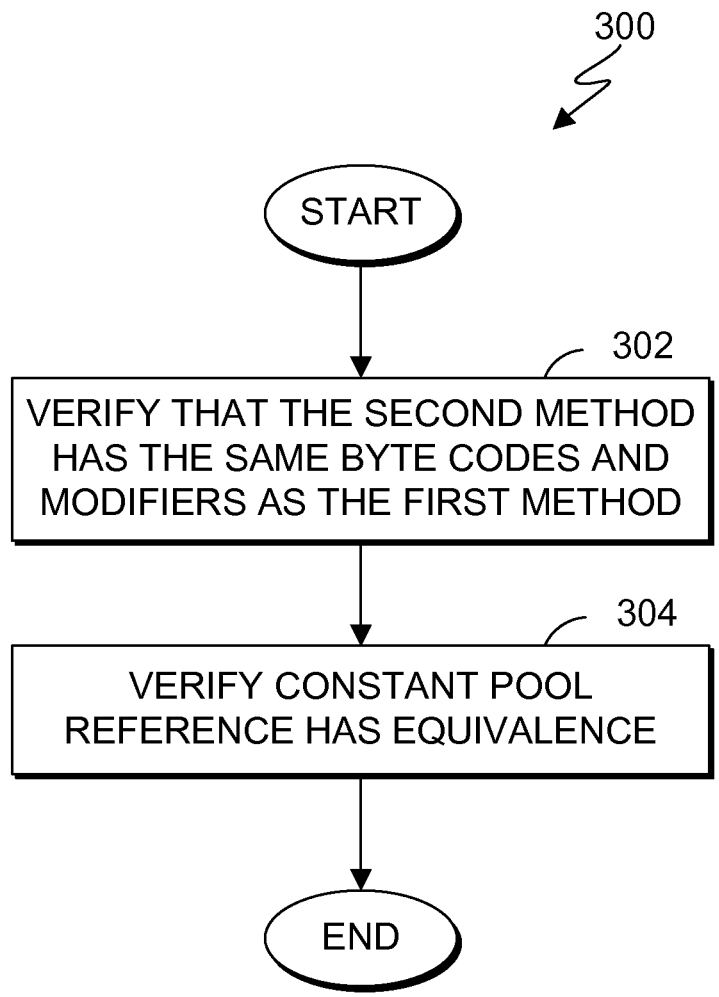
FIG. 3 is a flowchart illustrating operational steps for determining equivalence to avoid guard test invalidation, in accordance with an embodiment of the present invention.

FIG. 3 is a flowchart 300 illustrating operational steps for determining equivalence to avoid guard test invalidation, in accordance with an embodiment of the present invention. For illustrative purposes, the operational steps of flowchart 300 can be performed at step 206 of flowchart 200.

In step 302, optimizer 112 verifies that the second method has the same bytecodes and modifiers as the first method. In this embodiment, optimizer 112 verifies the second method has the same bytecodes and modifiers as the first method by parsing through the received code and comparing the bytecodes of the first received method to the second received method. For example, optimizer 112 can identify that method "Foo" is being compiled. Optimizer 112 can further identify that there are two "Foo" implementation methods in classes A and B. In this example, optimizer 112 has identified that the two "Foo" methods have the following bytecode:

```
public class A extends java.lang.Object {
    public int Foo( ) { return 5; }
}
public class B extends A {
    public int Foo( ) { return 5 }
}
```

Optimizer 112 can then parse, interpret, and compare the bytecode for implementation method Foo in class A to implementation method Foo in class B (e.g., A::Foo to B::Foo) to verify that implementation methods in A and B have the same bytecodes and modifiers. Using the above example, the static methods (e.g., A::Foo and B::Foo) have the same bytecodes.

In this embodiment, a modifier can indicate whether an object is public or private (e.g., based on the presence of the word "public" or "private"). Using the example above, the presence of the phrase "public static void" denotes that an instance of this class is public.

In step 304, optimizer 112 verifies that the constant pool reference has equivalence. In this embodiment, optimizer 112 verifies the constant pool reference has equivalence by verifying that the resulting final generated code is the same. In one instance, optimizer 112 can verify the constant pool reference has equivalence when the constant pool references of both implementations have the same variables and methods. Optimizer 112 can also verify that the constant pool reference has equivalence despite having different methods/fields if they are still mapped to the same v-table or instance field offsets. For example, the bytecodes in two methods can contain a call to two completely different methods (e.g., MySubClass1.m1 and MySubClas2.m2). However, optimizer 112 can verify that the v-table offset for "m1" in MysubClass1 is the same value as the v-table offset for "m2" in MySubClas2. Further, optimizer 112 can verify that "m1" and "m2" have the exact same parameter types, return types, and accepted the same values as arguments. Therefore, despite having different methods (e.g., a constant pool reference to MySubClass1.m1 and the other being MySubClass2.m2) optimizer 112 can identify that the generated code would be identical in both cases. Therefore, by verifying parameter types, return types, and accepted same values as arguments, optimizer 112 can verify that constant pool references have equivalence.

For static method/field or class references, optimizer 112 can verify method equivalence when the references are the same in both methods. In instances where any constant pool reference cannot be resolved at compile time in either method, or if the resolved code would not result in the same JIT generated code, then optimizer 112 would alert JIT compiler 106 to issue a slow virtual call dispatch path to be taken.

FIG. 4 is an example bytecode 400 that is verified as having equivalence, in accordance with an embodiment of the present invention. In this example, optimizer 112 can identify and verify methods having equivalence and reduce slow dispatch.

In this instance, a method "foo" is being compiled. JIT compiler 106 receives virtual call 402 (e.g., getSize) and identifies the implementation method is method 404 (e.g., bar). JIT compiler 106 can further identify class 406 (e.g., MyList) as the base class. JIT compiler 106 can further identify that method 404 points JIT compiler 106 to objects 410 and 412 and that conditions 414 indicate which object (e.g., objects 410 or 412) to retrieve at runtime which triggers JIT compiler 106 to initiate a devirtualization with a guard test.

JIT compiler 106 can detect abstract class 416, identified as "MyList", and first subclass 418, identified as "MyArrayList". JIT compiler 106 can further identify that an implementation of virtual call 402 is object 410 (e.g., "MyArrayList.getSize( )"). JIT compiler 106 can further identify second subclass 420, identified as "MyLinkedList", and a corresponding other implementation of virtual call 402 is object 412 (e.g., "MyLinkedList.getsize( )").

Responsive to determining that there is more than one implementation of virtual call 402, JIT compiler 106 calls optimizer 112 to determine equivalence between the two implementation methods (e.g., objects 410 and 412). Optimizer 112 can then verify equivalence by identifying and comparing objects 410 and 412 to verify that objects 410 and 412 have the same bytecodes. In this example, objects 410 and 412 are shown as having the same bytecode. Optimizer 112 can then verify that the constant pool reference has equivalence by identifying and comparing the constant pool reference both objects 410 and 412 point to. In this example, objects 410 and 412 are shown as having equivalence with respect to the constant pool reference because fields 419 and 421 (which correspond to objects 410 and 412, respectively) have the same offset. Optimizer 112 can then verify that objects 410 and 412 have equivalence and that the binary code generated for inlined object 410 would be identical to the binary code that would have been generated for object 412, had object 412 been inlined. Accordingly, JIT compiler 106 does not need to consider the second implementation for virtual call 402.

Figure 5:
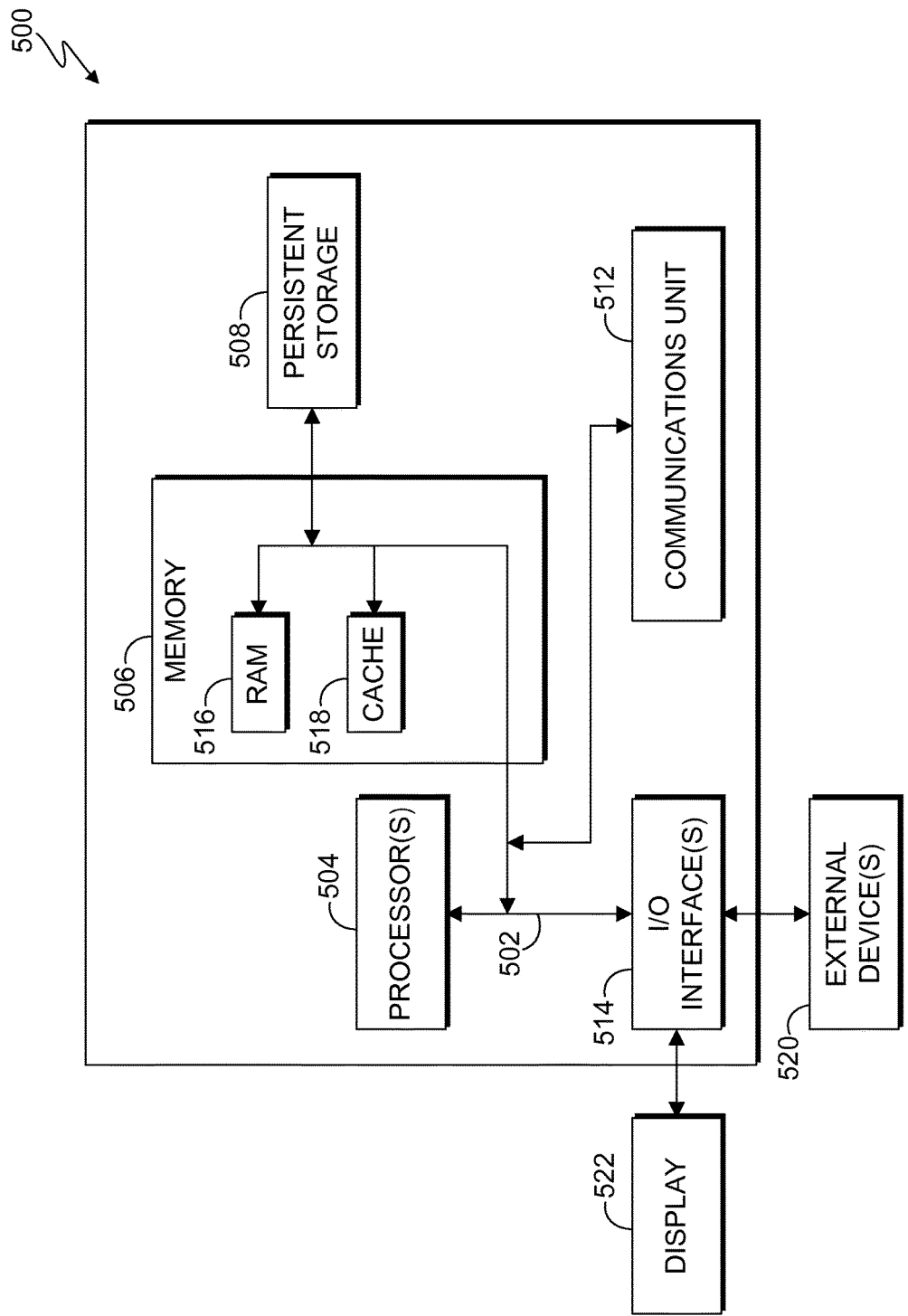
FIG. 5 is a block diagram of internal and external components of the computer systems of FIG. 1, in accordance with an embodiment of the present invention.

FIG. 5 is a block diagram of internal and external components of a computer system 500, which is representative of the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network. In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, a virtual call associated with a first implementation method;
   identifying, by one or more computer processors, a virtual call associated with a second implementation method that appears to have similar functionality to the first implementation method;
   determining, by one or more computer processors, whether the virtual call associated with the first implementation method and the virtual call associated with the second implementation method produce the same result by:
      determining either that bytecodes of the first implementation method match bytecodes associated with the second implementation method, or
      determining that constant pool references associated with the first implementation method match constant pool references associated with the second implementation method;
   responsive to determining that the virtual call associated with the first implementation method and the virtual call associated with the second implementation method produce the same result, using, by one or more computer processors, a result of the virtual call associated with the first implementation method as a result of the virtual call associated with the second implementation method; and
   responsive to determining that the virtual call associated with the second implementation method does not produce the same result as the virtual call associated with the first implementation method, deploying, by one or more computer processors, a slow dispatch of the second virtual call, wherein deploying a slow dispatch of the second virtual call comprises issuing a patch and performing a revirtualization.

2. The method of claim 1, wherein verifying, by one or more computer processors, that constant pool references associated with the first implementation method match constant pool references associated with the second implementation method comprises:
   identifying, by one or more computer processors, that constant pool references of the first implementation method differ from constant pool references of the second implementation method; and
   responsive to identifying that the constant pool references of the first implementation method differ from constant pool references of the second implementation method, identifying, by one or more computer processors, that the constant pool references of the first implementation method and the constant pool references of the second implementation method map to a same v-table.

3. The method of claim 2, wherein verifying, by one or more computer processors, that constant pool references associated with the first implementation method match constant pool references associated with the second implementation method comprises:
   responsive to identifying that the constant pool references of the first implementation method differ from constant pool references of the second implementation method, identifying, by one or more computer processors, that the constant pool references of the first implementation method and the constant pool references of the second implementation method map to one or more same instance field offsets.

4. A computer program product comprising:
   one or more computer readable storage media and program instructions stored on the one or more computer readable storage media, the program instructions comprising:
      program instructions to receive a virtual call associated with a first implementation method;

program instructions to identify a virtual call associated with a second implementation method that appears to have similar functionality to the first implementation method;
program instructions to determine whether the virtual call associated with the first implementation method and the virtual call associated with the second implementation method produce the same result by:
program instructions to determine either that bytecodes of the first implementation method match bytecodes associated with the second implementation method, or
program instructions to determine that constant pool references associated with the first implementation method match constant pool references associated with the second implementation method;
program instructions to, responsive to determining that the virtual call associated with the first implementation method and the virtual call associated with the second implementation method produce the same result, use a result of the virtual call associated with the first implementation method as a result of the virtual call associated with the second implementation method; and
program instructions to, responsive to determining that the virtual call associated with the second implementation method does not produce the same result as the virtual call associated with the first implementation method, deploy a slow dispatch of the second virtual call, wherein deploying a slow dispatch of the second virtual call comprises issuing a patch and performing a revirtualization.

5. The computer program product of claim 4, wherein the program instructions to verify that constant pool references associated with the first implementation method match constant pool references associated with the second implementation method comprise:
program instructions to identify that constant pool references of the first implementation method differ from constant pool references of the second implementation method; and
program instructions to, responsive to identifying that the constant pool references of the first implementation method differ from constant pool references of the second implementation method, identify that the constant pool references of the first implementation method and the constant pool references of the second implementation method map to a same v-table.

6. The computer program product of claim 5, wherein the program instructions to verify that constant pool references associated with the first implementation method match constant pool references associated with the second implementation method comprise:
program instructions to, responsive to identifying that the constant pool references of the first implementation method differ from constant pool references of the second implementation method, identify that the constant pool references of the first implementation method and the constant pool references of the second implementation method map to one or more same instance field offsets.

7. A computer system comprising:
one or more computer processors;
one or more computer readable storage media; and
program instructions stored on the one or more computer readable storage media for execution by at least one of the one or more computer processors, the program instructions comprising:
program instructions to receive a virtual call associated with a first implementation method;
program instructions to identify a virtual call associated with a second implementation method that appears to have similar functionality to the first implementation method;
program instructions to determine whether the virtual call associated with the first implementation method and the virtual call associated with the second implementation method produce the same result by:
program instructions to determine either that bytecodes of the first implementation method match bytecodes associated with the second implementation method, or
program instructions to determine that constant pool references associated with the first implementation method match constant pool references associated with the second implementation method;
program instructions to, responsive to determining that the virtual call associated with the first implementation method and the virtual call associated with the second implementation method produce the same result, use a result of the virtual call associated with the first implementation method as a result of the virtual call associated with the second implementation method; and
program instructions to, responsive to determining that the virtual call associated with the second implementation method does not produce the same result as the virtual call associated with the first implementation method, deploy a slow dispatch of the second virtual call, wherein deploying a slow dispatch of the second virtual call comprises issuing a patch and performing a revirtualization.

8. The computer system of claim 7, wherein the program instructions to verify that constant pool references associated with the first implementation method match constant pool references associated with the second implementation method comprise:
program instructions to identify that constant pool references of the first implementation method differ from constant pool references of the second implementation method; and
program instructions to, responsive to identifying that the constant pool references of the first implementation method differ from constant pool references of the second implementation method, identify that the constant pool references of the first implementation method and the constant pool references of the second implementation method map to a same v-table or map to one or more same instance field offsets.

* * * * *